Sept. 6, 1932.  E. J. KEARNEY  1,875,739
ATTACHMENT SPINDLE CLAMP
Original Filed April 24, 1923   3 Sheets-Sheet 1
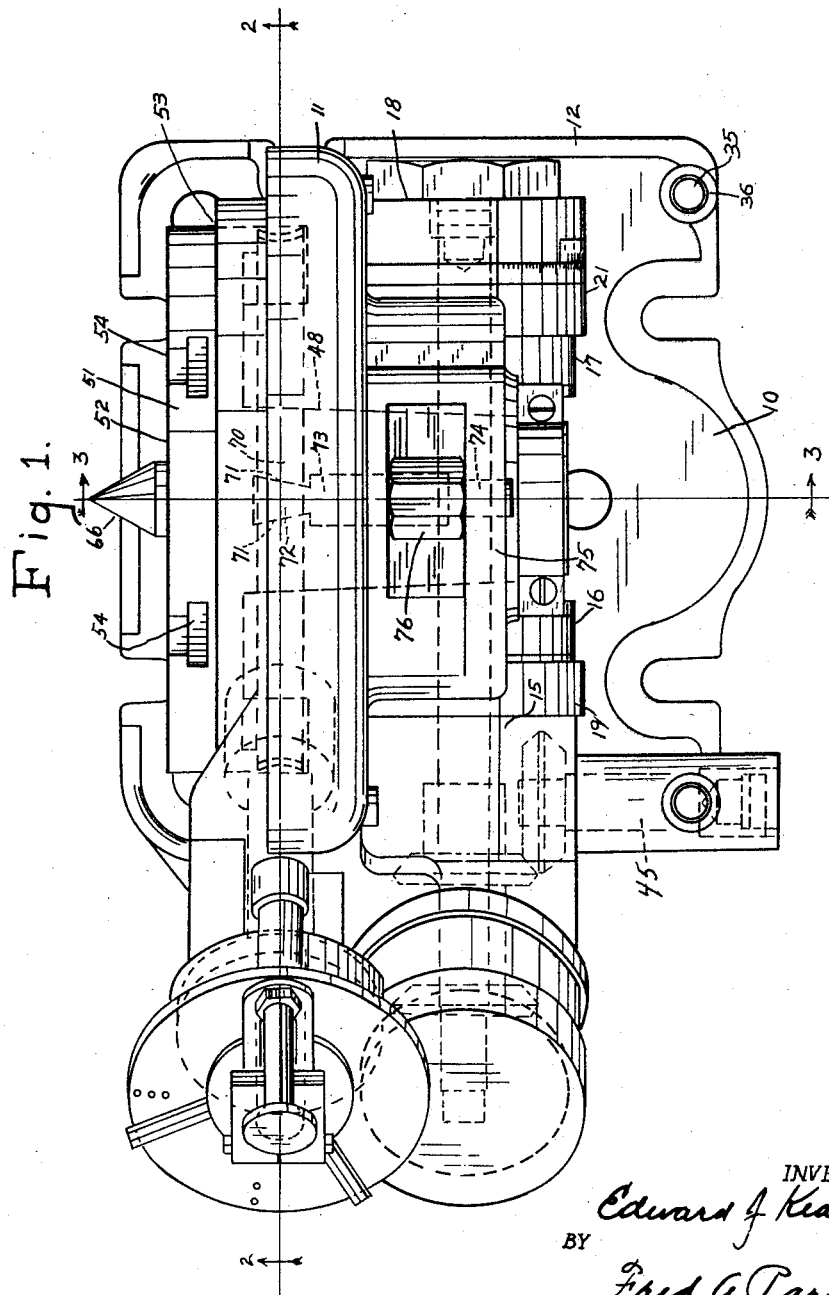

Sept. 6, 1932.   E. J. KEARNEY   1,875,739
ATTACHMENT SPINDLE CLAMP
Original Filed April 24, 1923   3 Sheets-Sheet 2

INVENTOR.
Edward J Kearney
BY
Fred A Parsons
ATTORNEY

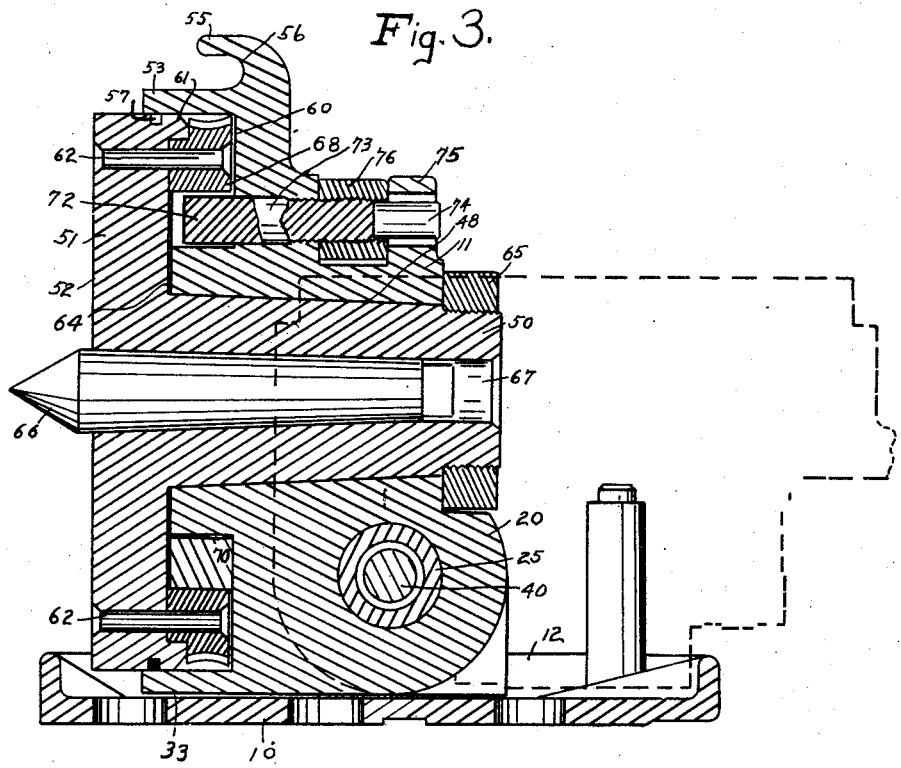

Patented Sept. 6, 1932

1,875,739

UNITED STATES PATENT OFFICE

EDWARD J. KEARNEY, OF WAUWATOSA, WISCONSIN, ASSIGNOR TO KEARNEY & TRECKER CORPORATION, OF WEST ALLIS, WISCONSIN

ATTACHMENT SPINDLE CLAMP

Original application filed April 24, 1923, Serial No. 634,292. Divided and this application filed May 23, 1927. Serial No. 193,475.

This invention relates to improvements in spindle clamps. It is particularly adapted for use in a machine tool attachment forming the subject matter of a companion application 634,292, filed April 24, 1923, of which this case is a division.

The machine tool attachment forming the subject matter of the above entitled parent application is adapted to perform many functions, including that of a dividing engine, with great accuracy, and the general purpose of this invention, together with that claimed in the parent application and other divisional applications, is to promote accuracy in a device of this character.

The specific object of the present invention is to promote accuracy by providing a spindle or work table clamp acting directly on the spindle or work table or a part rigidly connected therewith in such manner that there is no tendency to move the work table in the adjustment of the clamp. The location and construction of the clamping device are both of the utmost importance in achieving this end.

It is a further object of the invention to provide, in a device having an unusually large number of adjustments, a spindle clamp which may conveniently be manipulated in any position of spindle adjustment.

In the drawings:

Figure 1 is a plan view of the device embodying this invention.

Figure 2 is a section taken on the line 2—2 of Figure 1.

Figure 3 is a section taken on line 3—3 of Figure 1.

Figure 4 is a detail view in plan of an expansible clamp ring and expander.

Like parts are identified by the same reference characters throughout the several views.

My device as shown in the drawings is incorporated in a machine tool attachment known as a dividing head which comprises a base 10 provided with a number of spaced upstanding ears 15, 16, 17, and 18, which register with a number of complementary knuckles 19, 20, and 21 connected with a frame 11.

The frame 11 provides at 48 a tapered bearing opening within which a correspondingly formed spindle 50 is journaled. The larger end of the taper is normally at the front or working end of the dividing head structure. Where the terms front and rear are used herein they may be considered to refer to the working end, that is to say, the left in Fig. 3 as the front. A platen or table 51 having a working surface 52 may be and, in the present embodiment of this invention, is an integral part of spindle 50. The platen or table 51 projects axially from a close fitting sleeve 53 which is integral with frame 11. The projection of the table from said sleeve is sufficient to provide for the T slots shown at 54 wherein the heads of bolts may be introduced to secure work in an operative position upon said table or platen. This construction is of advantage because when the device is operated in the position in which it appears in the accompanying drawings the T slots permit work to be clamped rigidly to the spindle, and, when the frame 11 is rotated about pintle 25 to bring the axis of the spindle to a vertical position and the working face 52 of platen 51 horizontal, the table may then be used if desired in precisely the same manner as a rotary table attachment which is widely known in the art. I have provided in the frame casting 11 an integral lip portion 55 between which and the sleeve 53 is formed a trough 56 adapted to receive oil and chips when platen 51 is in use as a table. A packing ring 57 in a suitable groove in the table wipes the interior surface of sleeve 53 and prevents coolant and chips from reaching the interior mechanism of this device.

Rigidly connected to the rear of table 51 to comprise in effect a part thereof is a worm gear 60 which is preferably peripherally recessed as shown in Figure 3, to receive the corresponding shoulders 61 of the table. A plurality of axially extending pins 62 secure the table and worm gear 60 together. These parts are separately made only for convenience in manufacture. The worm gear is driven by a worm 63 which, in turn, is actuated from the shafts 40 or 45 through mechanism hereinafter to be described.

A nut 65, threaded to the end of the tapered spindle 50, maintains the spindle properly positioned within its bearing. Where the use of a center is desirable, the center pin 66 which tapers rearwardly may be introduced into the axially extending and correspondingly formed opening 67 of spindle 50 wherein it is retained frictionally and by the pressure of the work.

It will be noted that in the present embodiment of this invention the worm gear 60 comprises an annulus which is fast to the spindle adjacent the working end thereof and at the periphery of said end. When it is desired to lock the spindle in any given position of rotative adjustment, the inner surface 68 of the annular gear 60 is arranged to receive the clamping pressure of an expansible split ring 70. The extremities 71 of said ring converge symmetrically rearwardly as shown in Figure 4, and between them is fitted the wedge-shaped head 72 of a bolt or pin 73. The rear extremity 74 of said pin is extended through an apertured upstanding ear 75 between which and the body of frame casting 11 is confined a nut 76 in threaded engagement with bolt 73.

The arrangement is such that by the rotation of nut 76 the bolt 73 may be advanced or retracted axially to or from the platen. When the bolt is retracted as aforesaid, its wedge-shaped head 72 acts upon the correspondingly converging end faces 71 of the split ring 70 and thereby expands said ring symmetrically into contact with the inner surface 68 of the annular gear 60. In this way, the gear, together with the spindle and all related parts may be frictionally bound against rotational movement in either direction and inasmuch as the ring must expand equally in opposite directions from the center line of the device there will obviously be no tendency for the clamping operation to cause any rotational movement of the spindle. Such an arrangement makes for accuracy since an adjustment once obtained will not be disturbed when the parts are clamped.

This particular type of clamp has the further advantage that it tends to co-operate with the tapered spindle and spindle bearing to produce an unusually rigid clamping action. The wedge portion 72 has sides which converge rearwardly. Hence, the pin is moved toward the small end of the spindle to expand the clamping ring 70. Obviously, this ring will pass through a succession of degrees of frictional engagement with the spindle before the ultimate desired clamping pressure is reached. The ring is floated within its chamber and should it move at all in effecting clamping action, it could only move inwardly with the pin. In such a case, the spindle would be urged in the direction of the smaller end of its tapered bearing, but such urging could only result in movement if the spindle had previously been axially displaced from the desired clamped position.

The location of the clamp within a recess in the rear face of the platen is such that the clamp is protected from all possibility of accidental displacement. Additionally, the clamp is made more effective by virtue of its action directly on a portion of the platen near the outer periphery thereof. It will readily be appreciated that with comparatively large radius a given amount of clamping pressure will be far more effective to hold the spindle than would be the case if the radius were smaller. At the same time, the large radius at which the clamp operates has the effect of minimizing any possible displacement due to the clamping operation. In other words, even if some less balanced form of clamp than that herein disclosed were applied in a similar relation to the platen, a given displacement of the clamp would produce less angular displacement of the platen than would be the case if the clamp operated closer to the axis of the platen.

It will be observed that the nut 76, by which the clamp is operated, is substantially in the exact vertical center of the device and is, therefore, clearly accessible from all sides thereof. Even when the platen is tilted to a horizontal position, as shown in dotted lines in Figure 3, the nut 76 for adjustment of the clamp will still be readily accessible.

It will be understood that the invention herein disclosed is capable of a variety of different equivalents, each of which it is desired to protect if within the scope of the claims.

What is claimed is:

1. In a machine tool attachment, the combination of a spindle rotatable in a tapered bearing, a spindle clamp comprising an expansible ring and ring expanding means including a pin axially movable parallel with the spindle axis in the direction of the small end of the spindle bearing to expand the ring.

2. In a machine tool attachment, the combination with a spindle rotatable in a tapered bearing, of a spindle clamp including an expansible ring having two angular end faces converging toward the small end of said bearing.

3. In a machine tool attachment, the combination with a spindle rotatable in a tapered bearing, of a spindle clamp including an expansible ring having two angular end faces converging toward the small end of said bearing, and a ring expanding pin having a wedge-shaped end complementary to the end faces of said ring and means for moving the pin in the direction of the small end of the bearing to expand the ring.

4. A machine tool attachment including the combination with a work supporting member provided with a tapered bearing and an annular recess concentric therewith, of an expansible ring floating within said recess and provided with angularly formed end faces converging in the direction of the small end of said bearing, a wedge axially movable parallel to the spindle axis and confined against rotation about said axis, said wedge being disposed in the end faces of the ring and adapted to move toward the small end of said bearing for the expansion of said ring.

5. In an attachment for machine tools, the combination of a base, a frame adjustable on said base about a horizontal axis, a spindle rotatably supported from said frame in a tapered bearing having its axis at right angles to said horizontal axis, a member fixed on said spindle and providing an annular surface concentric with said bearing, and clamp means cooperative with said annular surface to fix said spindle against rotation and simultaneously to urge said spindle in the direction of the smaller end of said tapered bearing.

6. In an attachment for machine tools the combination of a base, a frame adjustable on said base about a horizontal axis, a spindle rotatably supported from said frame in a tapered bearing, and axially at right angles with said horizontal axis, a driving gear fixed with said spindle for power movement thereof, said gear having associated therewith an annular surface concentric with the axis of said spindle, an annular ring providing a surface complementary to said annular surface but normally disengaged therefrom and means adapted to change the diameter of said ring whereby to frictionally engage said surfaces and simultaneously to urge said ring axially in the direction of the smaller end of said tapered bearing.

In witness whereof I hereto affix my signature.

EDWARD J. KEARNEY.